2 Sheets—Sheet 1.

M. J. AMICK.

AUTOMATIC GAS REGULATOR.

No. 10,901. Reissued Feb. 14, 1888.

WITNESSES

E. A. Newman,
C. M. Newman

INVENTOR

Myron J. Amick,

By his Attorneys,

Baldwin Hopkins & Peyton.

N. PETERS, Photo-Lithographer, Washington, D. C.

2 Sheets—Sheet 2.

M. J. AMICK.

AUTOMATIC GAS REGULATOR.

No. 10,901. Reissued Feb. 14, 1888.

WITNESSES

E. C. Newman,

E. M. Newman

INVENTOR

Myron J. Amick.

By his Attorneys

Wilkinson Hopkins & Pigton.

N. PETERS, Photo-Lithographer, Washington, D. C.

UNITED STATES PATENT OFFICE.

MYRON J. AMICK, OF PORTLAND, OREGON.

AUTOMATIC GAS-REGULATOR.

SPECIFICATION forming part of Reissued Letters Patent No. 10,901, dated February 14, 1888.

Original No. 333,584, dated January 5, 1886. Application for reissue filed January 4, 1888. Serial No. 259,815.

*To all whom it may concern:*

Be it known that I, MYRON J. AMICK, of Portland, in the county of Multnomah and State of Oregon, have invented certain new and useful Improvements in Automatic Gas-Regulators, of which the following is a specification, reference being had to the accompanying drawings, which illustrate my improvements.

My invention relates to that class of regulators used to regulate the pressure and flow of illuminating-gas through the supply-pipes of buildings.

My improvements consist in certain combinations of parts, hereinafter described and claimed, by which I obtain a satisfactory action of the valve, prevent vibration, and secure a liquid seal in small space, together with simplicity, durability, compactness, and economy of construction.

Figure 1:
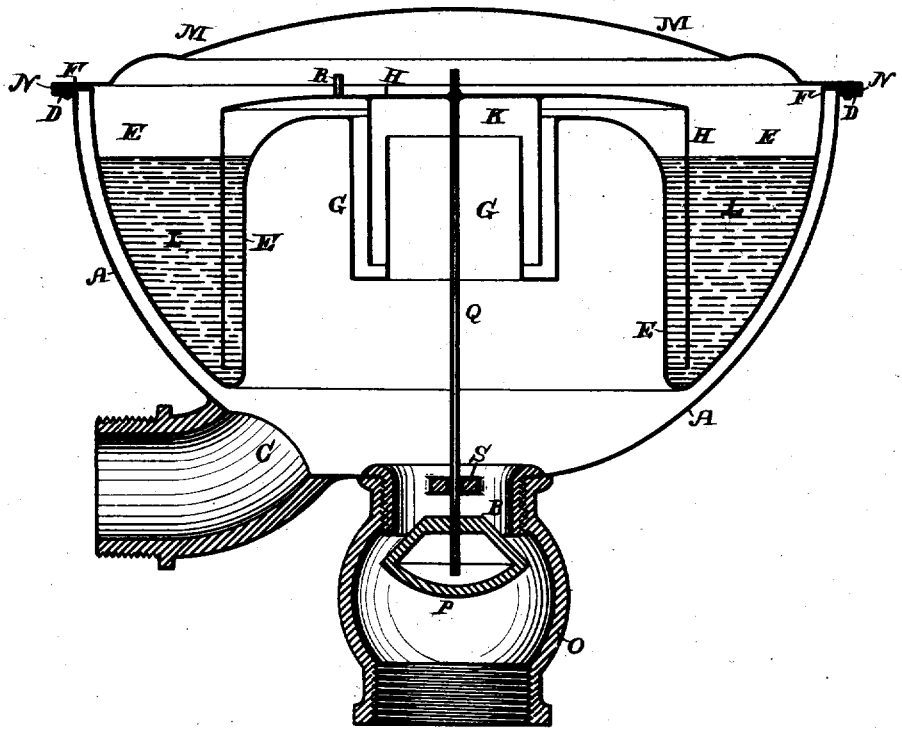
Figure 2:
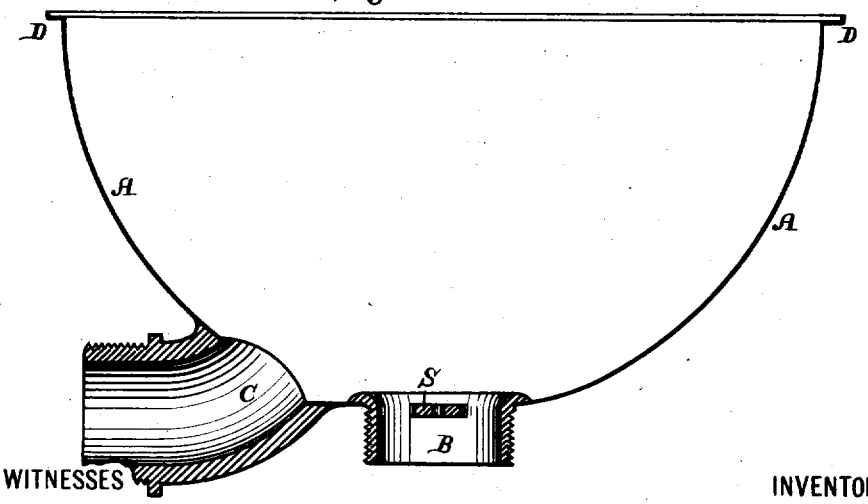
Figure 3:
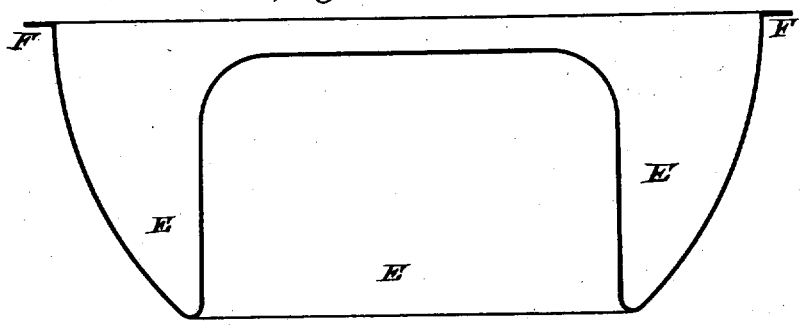
Figure 4:
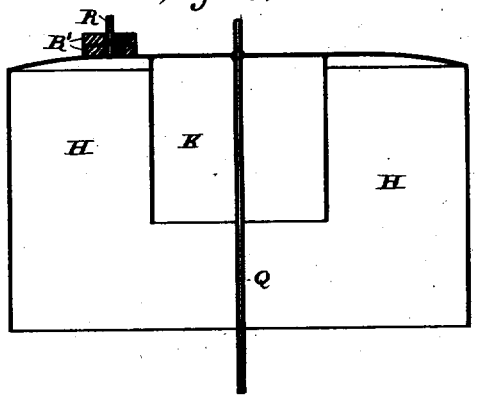
Figure 5:
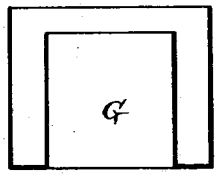

In the accompanying drawings, Figure 1 is a vertical central section through my improved gas-regulator. Fig. 2 is a vertical central section through the outside case. Fig. 3 is a vertical central section through the reservoir for containing the liquid seal. Fig. 4 is a vertical central section through the gas-drum, showing the tubular guide secured within it; and Fig. 5 is a vertical central section of the double tubular guide.

All the parts illustrated in Figs. 2 to 5, inclusive, are shown detached, while Fig. 1 shows them organized together.

Referring to the letters upon the drawings, in aid of a description in detail of my improvements, A indicates the outside hemispherical case, which may be cast integral with the inlet B, an outlet, C, and with the flange D around its margin at the top. The inlet and outlet projections B and C, with openings through them, may afterward be screw-threaded, as shown, for the attachment of gas-pipes.

E indicates the circular inner casting forming the annular receptacle for the liquid seal, and provided with a flange, F, around its upper margin, adapted to fit over and be secured upon the flange D of the case, as shown in Fig. 1. The double tubular guide G is secured to the inner casting, E, as shown in Fig. 1.

H indicates the gas-drum, preferably made of sheet metal, as usual, provided with the tubular guide K, which fits into the annular double tubular guide G, as shown in Fig. 1, but does not reach its bottom.

L indicates the liquid forming the seal, in which the gas-drum is partially immersed. The receptacle for the liquid seal is so formed and the gas-drum is so immersed in the liquid that the great body of the liquid is outside of the drum, and only a small surface of the liquid is exposed to pressure of gas within the drum. This arrangement produces a better seal with a given volume and depth of liquid, and prevents in a large measure the contamination and thickening of the liquid by deposits from impure gas.

M indicates the cap, preferably having a rounded contour, as shown, and having a marginal flange, N, to seat it, as shown in Fig. 1. This cap may also be of cast metal, and be secured in place by bolts or rivets, or in any other usual manner.

O indicates a short bulbous section of pipe, internally screw-threaded at both ends for connection to the inlet B and to a gas-pipe. Working within this bulbous section is the valve P, connected by the rod Q to the top of the gas-drum. The lower end of the rod is preferably screw-threaded and connected to the valve in that way, so that the valve may readily be adjusted on the rod to any desired position. The valve is also preferably rounded on its exterior, as shown, by which a more equable pressure of the gas for the purpose of seating it is secured, as in case of a ball-valve.

R indicates a pin on top of the gas-drum and at one side of the center, the purpose of which is to hold one or more suitable weights, R′, to counteract gas-pressure and prevent vibration of the drum, so that its movements will always be up and down steadily in the same plane, which gives better results, the action of the regulator being more uniform and certain. This plan is much superior to that in which ordinary guides are used, because they cause friction and detract from the delicacy and accuracy of the regulator.

S indicates a guide for the valve-rod, which has a hole through it considerably larger than the diameter of the valve-rod, so as to avoid unnecessary friction and give the valve-rod a little lateral play. The consequence is, if the gas-drum floats or tilts slightly to one side, the valve P will nevertheless center and seat closely enough for all practical purposes, because of its tapering shape, and the large hole in the guide S will accommodate slight lateral movement or tilting of the drum and prevent the valve-rod from binding or encountering obstructive friction. It is important, where a pendent jointless valve-rod, Q, is used, that but a single guide, S, such as described, be employed. The regulator, it will be seen, has the form, approximately, of a hemisphere, which is convenient to make and is shapely in appearance.

The operation is as usual in this class of gas-regulators, the gas entering and passing out as indicated by the arrows, and the gas-drum responding to pressure and operating the valve properly to cause the flow of gas to be generally uniform.

It will be observed that I use the ordinary elements of this class of gas-regulators, but, as I claim, of improved construction and organization together, and as I will now specifically point out and sum up in my claims.

What I claim as new, and desire to secure by Letters Patent of the United States, is—

1. In a gas-regulator, the combination of the flanged hemispherical case A, the flanged inner circular casting, E, and the double tubular guide G, all constructed and arranged substantially as set forth.

2. In a gas-regulator, the combination of the flanged hemispherical case A, the flanged inner circular casting, E, the double tubular guide G, the gas-drum, the guide K, carried by the gas-drum, and the weight R′, applied to one side of the drum, substantially as set forth.

In testimony whereof I have hereunto subscribed my name this 10th day of September, 1887.

MYRON J. AMICK.

Witnesses:
MARCUS S. HOPKINS,
C. P. ELWELL.